Figure 1:
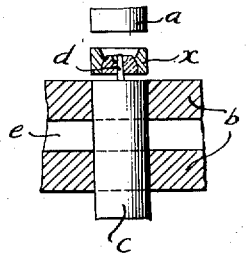
Figure 2:
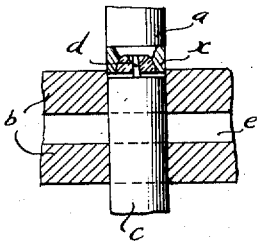
Figure 3:
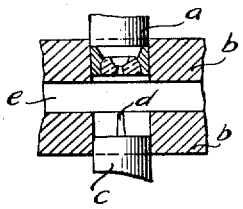
Figure 4:
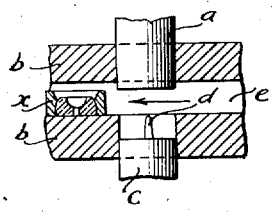

May 29, 1928. Re. 16,982

H. COLOMB

PROCESS FOR FINISHING JEWEL SETTINGS AND PRODUCT THEREOF

Original Filed April 24, 1923

INVENTOR
Henri Colomb
BY A. Parkhurst
ATTORNEY

Reissued May 29, 1928. Re. 16,982

UNITED STATES PATENT OFFICE.

HENRI COLOMB, OF TAVANNES, SWITZERLAND.

PROCESS FOR FINISHING JEWEL SETTINGS AND PRODUCT THEREOF.

Original No. 1,528,872, dated March 10, 1925, Serial No. 634,349, filed April 24, 1923. Application for reissue filed January 6, 1927. Serial No. 159,468.

In certain time-keeping pieces jewel settings are used in order to serve as bearings for the wheelwork. These settings contain a jewel, set in the metal in the holes of which the pivots of the said wheels are placed. The invention is also applicable to bushings which are merely perforated metal plugs used in time-keeping mechanisms which are not provided with stones, but, on the contrary, are cylindrical metal pieces pierced or bored along their longitudinal axes.

It is of great importance that the periphery of a jewel setting or bushing should be of exact circumference, having its center in the axis of the hole in the stone or in the axis of the hole in the bushing, as the case may be.

The object of the present invention is to provide a method according to which the peripheral surfaces of bushings and jewel settings for time-keeping pieces can be rendered truly cylindrical and this with the required axial boring in the bushing or through the stone of the setting at the exact center of the circle defined by said peripheral surface. This is accomplished by maintaining the stone or the bushing in position by the hole therethrough, so that the axis of the latter is central with respect to an opening in a punch and a die, by means of which the circumference of the piece is then rectified by forcing the work through the opening in the die.

This process may be realized in different ways, that is by different forms of apparatus, some of which, by way of example, are embodied in the accompanying drawing. Such constructions, however, form no part of the present invention; on the contrary, they form part of an application filed by me on September 28, 1921, under Serial No. 503,994, issued January 13, 1925, as Patent No. 1,523,169.

Figure 5:
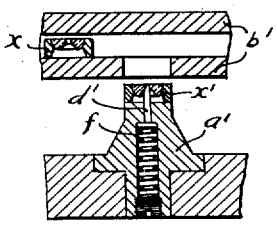
Figure 6:
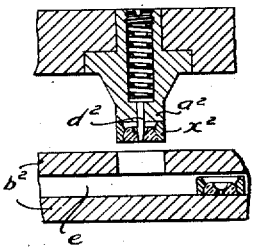
Figure 7:
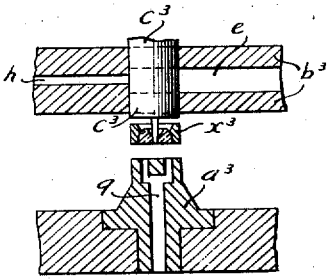

In the drawings:

Figs. 1, 2, 3 and 4 illustrate one method of carrying the invention into effect; and Figs. 5, 6 and 7 illustrate respectively three further methods.

Referring to Figs. 1–4 inclusive, *a* indicates a punch adapted to cooperate with a die *b*. Through an opening in the latter is adapted to glide a guide-member *c*, which at one end is provided with a centrally-disposed conical pin *d*, for the purpose hereinafter to be described. The said guide-member makes a snug fit with the opening in the die *b* so that it can be reciprocated through said opening without the possibility of lateral movement. In Fig. 1, the parts are indicated in what may be termed their starting position, that is to say, the upper edge of the guide member *c* is flush with the upper face of the die *b*, and the punch *a* is poised above the setting to be operated upon but some little distance therefrom with a bushed jewel setting *x* mounted on pin *d*. As the punch *a* commences its downward movement, the guide member *c* is retracted a little, as will be seen in Fig. 2, and, as the punch contacts with and forces the jewel setting downward, it will be seen that the said setting is bound to follow the guide member *c* into the opening in the die owing to its engagement with the pin *d*, which is located in the axis of the said guide member and by reason of the fact that said member makes a good fit in the said opening. After the parts have attained the position shown in Fig. 2, the guide member *c* is withdrawn to the position shown in Fig. 3, whereupon the punch *a*, in continuing its downward movement, forces the setting through the remainder of the opening in the upper part of the die, out into a channel *e*, through which is forced a current of air sufficiently strong to carry the setting out of the channel and into any appropriate receptacle or otherwise.

On the upward movement of the punch *a*, the guide member *c* also moves upwardly, until the said parts are again in position for a further setting to be placed on the pin *d*, after which the operation is repeated as above described, and so on, all as above described with reference to Fig. 1 and therein illustrated.

In the construction shown in Fig. 5, the pin $d^1$ is disposed in a punch $a^1$ placed underneath the die $b^1$. A spring *f* constantly maintains the pin in its operative position as shown in said figure. The pin, as in the first described example, is of a conical shape and its purpose is to firmly maintain the jewel setting $x^1$ or the bushing, as the case may be, in a perfectly central position with respect to the cutting edge of the die $b^1$. The action will be obvious from that described above.

In the construction shown in Fig. 6, the punch $a^2$ is on top. It is movable with respect to the die $b^2$ in which an opening is made cooperating with the punch for the rectification of the exterior periphery of a setting or bushing $x^2$. The conical guide pin $d^2$ operates as before described, and the finished bushed jewel is discharged through channel $e$.

In the construction illustrated in Fig. 7, a guide member $c^3$ holds the piece $x^3$ to be operated on in a centered position with respect to the die $b^3$, which is lowered to meet the punch $a^3$. A pipe or passage $g$ is provided in the latter through which compressed air passes to assist in holding the setting or bushing in its place on the pin of the guide member $c^3$ during the entire duration of the finishing process. Afterwards the setting or bushing can be ejected from the inside of the die through the channel $e$ by means of compressed air forced through the pipe or passage $h$.

The metallic bushing or perforated and bushed jewel forming the product of my above described process both necessarily have outer peripheries exactly concentric with the perforation which, in either case, is to serve as journal bearing for a rotating shaft or pintle in the watch movement in which it is to be used, and, in the case of a bushed jewel, this is true whether or not the inner periphery of the bushing and the cooperating outer periphery of the jewel set therein, is, or is not, concentric with said perforation. Also, any fine tool markings appearing on this outer cylindrical metallic periphery of said bushing necessarily extend parallel to the axis of said outer cylindrical surface, instead of encircling the same as would be the case if said outer bushing surface had been turned out in a lathe instead of having been die-cut, as above described.

This feature is of considerable importance when such bushing or bushed jewels is set in a watch movement by forcing it into a hole previously punched in the movement plate or bridge, because any minute grooves or ridges formed by said tool markings as a result of the cutting action of the die then cooperate smoothly with any similar ones in the hole in plate or bridge which may have been produced by the similar cutting action of the punch which cut said hole, or rectified it, as described in my U. S. Patent No. 1,571,756 granted February 22, 1926.

What I claim and desire to secure by Letters Patent is:

1. The method of finishing the peripheral surfaces of bearings for time-keeping mechanism, which consists in centering the hole in the bearing with respect to a die, forcing the bearing into the die while maintaining it centered, and forcing the bearing through the die, the walls of the die effecting the required rectification of the bearing.

2. In a method of finishing the peripheral surfaces of bushings and settings for time-keeping pieces, mounting and maintaining the bushings and settings by their axial boring in a centered position with respect to a punch and a die, and then rectifying the peripheral surface of said bushings and settings by said punch and die by forcing them through the opening in the die, the walls of which opening perform the required rectification.

3. In a method of finishing the peripheral surfaces of bushings and settings for time-keeping pieces, mounting and maintaining the bushings and settings in a centered position with respect to a punch and a die on a conical pin positioned in the axis of said punch and die and on which pin the bushings and settings can be mounted by means of the axial bore therethrough, and then forcing the work through the opening in the die by means of the punch, the walls of the die forming said opening effecting the required rectification of the bushings and settings.

4. In a process for finishing bushings and settings for time-keeping pieces mounting and maintaining the bushings and settings in centered position with respect to a punch and a die by means of an upstanding conical pin located on a guide member adapted to pass through an opening in the die, which pin is retracted as soon as the work is engaged by the die, and then forcing said work through the die.

5. The method of finishing bushings and settings for time-keeping mechanism comprising mounting and maintaining the bushings and settings by the axial bore therethrough on a conical pin disposed in the axial center of a punch and die, forcing the bushings and settings into an opening in the die of which said pin is the axial center, retracting said pin during the engagement of the bushings and settings by the die, at the same time continuing the said movement through the die, and finally removing the bushings and settings from the die through a lateral opening therein by compressed air.

6. A product of the herein described process, being a centrally perforated journal bearing for timepieces, having a cylindrical, metallic die-cut outer periphery exactly concentric with its central perforation, all tool marks on said outer periphery extending parallel to the axis of said perforation as a result of the said die cutting of said periphery.

7. A product of the herein described process, being a perforated, bushed jewel bearing for watches having a cylindrical, metallic, die-cut periphery exactly concentric with the axis of said jewel perforation; all tool marks on said outer periphery extending parallel to the axis of said perforation as a result of the said die-cutting of said periphery.

Signed at Berne, Switzerland, this 19th day of August, 1927.

HENRI COLOMB.